(12) United States Patent
Joncheray et al.

(10) Patent No.: US 9,988,504 B2
(45) Date of Patent: Jun. 5, 2018

(54) REINFORCED ORGANIC NATURAL FIBER COMPOSITES

(71) Applicant: Huntsman International LLC, The Woodlands, TX (US)

(72) Inventors: Thomas Julien Joncheray, Wavre (BE); Jan Vandenbroeck, Scherpenheuvel-Zichem (BE)

(73) Assignee: HUNTSMAN INTERNATIONAL LLC, The Woodlands, TX (US)

( * ) Notice: Subject to any disclaimer, the term of this patent is extended or adjusted under 35 U.S.C. 154(b) by 0 days. days.

(21) Appl. No.: 15/126,311

(22) PCT Filed: Dec. 11, 2014

(86) PCT No.: PCT/EP2014/077315
§ 371 (c)(1),
(2) Date: Sep. 15, 2016

(87) PCT Pub. No.: WO2015/144267
PCT Pub. Date: Oct. 1, 2015

(65) Prior Publication Data
US 2017/0081485 A1 Mar. 23, 2017

(30) Foreign Application Priority Data

Mar. 28, 2014 (EP) .................................... 14162187

(51) Int. Cl.
| | | |
|---|---|---|
| *C08J 9/32* | (2006.01) | |
| *C08J 5/04* | (2006.01) | |
| *C08G 18/64* | (2006.01) | |
| *C08G 18/70* | (2006.01) | |
| *C08L 97/02* | (2006.01) | |
| *C08G 18/76* | (2006.01) | |
| *C08G 18/80* | (2006.01) | |
| *C08L 75/04* | (2006.01) | |
| *C08G 18/28* | (2006.01) | |
| *C08J 5/10* | (2006.01) | |
| *C08L 75/02* | (2006.01) | |
| *C08G 101/00* | (2006.01) | |

(52) U.S. Cl.
CPC ............ *C08J 5/045* (2013.01); *C08G 18/283* (2013.01); *C08G 18/6492* (2013.01); *C08G 18/706* (2013.01); *C08G 18/7664* (2013.01); *C08G 18/80* (2013.01); *C08J 5/10* (2013.01); *C08L 75/02* (2013.01); *C08L 75/04* (2013.01); *C08L 97/02* (2013.01); *C08G 2101/0091* (2013.01); *C08J 2375/02* (2013.01); *C08J 2375/04* (2013.01); *C08J 2475/04* (2013.01)

(58) Field of Classification Search
CPC ..... C08J 5/045; C08G 18/283; C08G 18/6492
See application file for complete search history.

(56) References Cited

U.S. PATENT DOCUMENTS

| | | | |
|---|---|---|---|
| 4,256,841 A | 3/1981 | Horacek et al. | |
| 4,568,703 A | 2/1986 | Ashida | |
| 6,407,196 B1 | 6/2002 | Chin-Chang et al. | |
| 8,691,005 B2 | 4/2014 | Moriarty et al. | |
| 9,303,113 B2 | 4/2016 | Grigsby et al. | |
| 9,314,947 B2 | 4/2016 | Moriarty et al. | |
| 2005/0245629 A1 | 11/2005 | Grigsby et al. | |
| 2011/0124756 A1 | 5/2011 | Singh et al. | |
| 2011/0201706 A1 | 8/2011 | Athey et al. | |
| 2011/0201707 A1 | 8/2011 | Athey et al. | |
| 2011/0201708 A1 | 8/2011 | Athey et al. | |
| 2011/0201709 A1 | 8/2011 | Athey et al. | |
| 2012/0058697 A1* | 3/2012 | Strickland .............. B82Y 15/00 442/59 |

FOREIGN PATENT DOCUMENTS

| | | |
|---|---|---|
| DE | A 102012012408 | 1/2014 |
| WO | WO-A 2008/144770 | 11/2008 |
| WO | WO-A 2010/147936 | 12/2010 |
| WO | WO-A 2012/062796 | 5/2012 |
| WO | WO-A 2012/076506 | 6/2012 |
| WO | WO-A 2013/012845 | 1/2013 |

OTHER PUBLICATIONS

Shi Jianjun et al., "Heat insulation performance, mechanics and hydrophobic modification of cellulose-SiO2 composite aerogels", Carbohydrate Polymers, vol. 98, No. 1, Jun. 19, 2013, p. 282-289.

* cited by examiner

*Primary Examiner* — Hannah J Pak
(74) *Attorney, Agent, or Firm* — Huntsman International LLC; Robert Diaz

(57) ABSTRACT

A reinforced organic natural fiber composite material having a lambda value in the range 15-35 mW/m·K is disclosed which comprises 25-85% by weight hydrophobic nanoporous particles calculated on the total weight of the composite material, at least 10% by weight organic natural fibers having isocyanate reactive groups calculated on the total weight of the composite material and 1-15% by weight binder selected from a polyurea/polyurethane comprising binder made from emulsifiable polyisocyanate, water and surfactants.

13 Claims, No Drawings

REINFORCED ORGANIC NATURAL FIBER COMPOSITES

CROSS-REFERENCE TO RELATED APPLICATIONS

This application is the National Phase of International Application PCT/EP2014/077315 filed Dec. 11, 2014 which designated the U.S. and which claims priority to European App. Serial No. 14162187.0 filed Mar. 28, 2014. The noted applications are incorporated herein by reference.

FIELD OF INVENTION

The present invention is related to the synthesis of composite materials having superior thermal insulation properties without deteriorating the mechanical properties such as mechanical strength and self-supporting properties of the composites.

In particular, the present invention is related to composite materials comprising organic natural material (preferably wood fibres), a polyisocyanate based binder (emulsifiable polyisocyanate) and hydrophobic nanoporous particles (preferably silica-based).

The composite materials according to the invention are suitable for use as insulation products (thermal and/or acoustic).

BACKGROUND

Organic natural fibers such as wood fibres are currently widely used for making composite panels and are widely used for thermal insulation applications, in particular composite wood panels. Composite wood panels in general are very attractive in construction industry because of their self-supporting properties and mechanical strength. Composite wood board products such as particleboard, medium density fiberboard (MDF), high density fiberboard (HDF) and oriented strand board (OSB) are used in many applications such as home roofing and flooring, furniture, cabinets, door panels, frames, signposts, . . . . Generally, to make such composite products a particulate lignocellulosic (wood) substrate is mixed with a binder, and the mixture is put on a mat or other surface for pressing. WO 2008/144770, WO 2010/147936 and WO 2013/012845 describe methods to fabricate composite wood panels.

However, for thermal insulation applications, ideally the lambda value (thermal conductivity) of composite wood panels should be further improved in order to compete with existing super-insulator materials (which have significantly better lambda values e.g. 20-30 mW/m·K at 10° C. for polyurethane rigid foams).

Recent developments in further improving the insulation value for wood fibre insulation boards resulted in thermal conductivity values (i.e. lambda values) ranging between 35 and 50 mW/m·K at 10° C. under atmospheric pressure, depending mainly on panel density (ranging typically from 40 to 200 kg/m$^3$). The lambda value is usually decreased to some extent by decreasing density. For instance, a panel of density 200 kg/m$^3$ typically has a lambda value around 50 mW/m·K, while a panel of density 40 kg/m$^3$ typically has a lambda value around 35 mW/m·K. With this approach, a lambda value of about 35 mW/m·K is the minimum which can be achieved. Going further down in density would result not only in panels with increased lambda values but also with poor mechanical properties (e.g. limited structural integrity).

There is a need to develop a fabrication method to further improve significantly the thermal insulation properties of insulation materials (e.g. panels) based on organic natural fibers such as composite wood panels. To fulfil the properties of the construction industry these materials ideally should be self-supporting and have excellent mechanical properties.

It is a challenge to further improve significantly the thermal insulation properties of insulation materials (panels) based on organic natural fibers such as composite wood panels towards lambda values lower than 35 mW/m·K, preferably in the range 15-30 mW/m·K (measured at 10° C.) without deteriorating the mechanical strength of the materials.

Goal of the Invention

It is the goal of the invention to develop a composite material which has beside excellent thermal insulation properties also good mechanical and self-supporting properties.

It is a further goal to fabricate a composite material comprising organic natural fibers and more than 25% by weight nanoporous particles, said composite material having light weight, good mechanical properties, self-supporting properties and a low lambda value.

It is a further goal to develop a binder composition and a processing method to combine the organic natural fibers (preferably in the form of wood fibres) and the nanoporous particles such that a novel composite material is created having improved mechanical properties, self-supporting properties and a low lambda value compared to state of the art composites comprising organic natural fibers.

Therefore, the present invention relates to a novel composite material, a novel binder composition based on emulsifiable polyisocyanate, a novel processing method to fabricate the novel composite and use of the novel composite material for thermal and/or acoustic insulation.

SUMMARY OF THE INVENTION

According to the invention, a reinforced organic natural fiber composite material having a lambda value in the range 15-35 mW/m·K is disclosed, said composite material comprising:
- 25-85% by weight hydrophobic nanoporous particles calculated on the total weight of the composite material, and
- At least 10% by weight organic natural fibers having isocyanate reactive groups calculated on the total weight of the composite material, and
- 1-15% by weight binder,
- Wherein the binder used is a polyurea/polyurethane comprising binder made from emulsifiable polyisocyanate, water and surfactants.

According to embodiments, the composite material comprises 25-85% by weight, preferably 35-85% by weight, more preferably 40-85% by weight hydrophobic nanoporous particles calculated on the total weight of the dried and cured composite material.

According to embodiments, the composite material comprises 10-70% by weight, preferably 10-60% by weight and more preferably 10-50% by weight organic natural fibers having isocyanate reactive groups calculated on the total weight of the dried and cured composite material.

According to embodiments, the composite material comprises 1-15. % by weight, preferably 2-10% by weight and more preferably 3-8% by weight binder calculated on the total weight of the dried and cured composite material.

According to embodiments, the nanoporous particles are aerogel particles based on oxides, preferably based on silicon dioxide ($SiO_2$) and/or metal oxides wherein the metal is preferably selected from alumina, titanium and/or zirconium oxides which are optionally organo-modified.

According to embodiments, the nanoporous particles have the following parameters:
Porosity: 50 to 99%, especially 70 to 99%, more preferably 80 to 99%
Density: lower than 300 kg/m$^3$, preferably in the range 30 to 300 kg/m$^3$, more preferably <180 kg/m$^3$
Particle diameter: from 0.001 to 10 mm, preferably from 0.01 to 4 mm
Pore diameter: 0.1 to 500 nm, especially <200 nm, more preferably <100 nm, especially 1 to 100, preferably 10 to 50 nm According to embodiments, the nanoporous particles are aerogel particles which are organo-modified with hydrophobic groups, are based on silicon dioxide ($SiO_2$) and have lambda values under atmospheric pressure in the range 9-12 mW/m·K at 25° C. together with a low density around 140 kg/m$^3$.

According to embodiments, the nanoporous particles have hydrophobic groups on their pore surface selected from trisubstituted silyl groups of general formula —Si(R)$_3$, preferably trialkyl- and/or triarylsilyl groups, where each R is independently a nonreactive organic moiety such as C1-C18 alkyl or C6-C14 aryl, preferably C1-C6 alkyl or phenyl, more particularly methyl, ethyl, cyclohexyl or phenyl, which moiety may be additionally substituted with functional groups.

According to embodiments, the organic natural fibers are selected from wood or bamboo fibers.

According to embodiments, the binder comprises emulsifiable polyisocyanate which is a reaction product of >95 wt % polyisocyanates and <5 wt % of monoalkyl ethers and/or polyethylene glycols calculated on the total weight of the emulsifiable polyisocyanate and wherein the polyisocyanate is preferably selected from an aromatic diisocyanate or polyisocyanate of higher functionality in particular crude mixtures of methylene bridged polyphenyl polyisocyanates containing diisocyanates, triisocyanate and higher functionality polyisocyanates or isocyanate ended prepolymers made by reaction of an excess of a diisocyanate or higher functionality polyisocyanate with a hydroxyl ended polyester or hydroxyl ended polyether and products obtained by reacting an excess of diisocyanate or higher functionality polyisocyanate with a monomeric polyol or mixture of monomeric polyols such as ethylene glycol, trimethylol propane or butane-diol.

According to embodiments, the binder comprises up to maximum 5 weight % surfactants, preferably less than 1 weight % calculated on the total weight of surfactant and water and wherein the surfactants are preferably silicon based surfactants.

According to embodiments, a process for making the composite material according to the invention is disclosed, said process comprising at least following steps:
a) Providing the binder comprising water, emulsifiable polyisocyanate and surfactants, and
b) Providing the organic natural fibers, and then
c) Mixing the binder and organic natural fibers to obtain a mixture comprising the organic natural fibers and the binder, and then
d) Adding the hydrophobic nanoporous particles to the mixture obtained in c) and mixing to obtain a homogenous mixture comprising the nanoporous particles, the organic natural fibers and the binder, and then
e) Curing and drying the mixture in a compression mold to obtain the reinforced organic natural fiber composite material.

According to embodiments, the step of curing and drying in the process for making the composite material according to the invention is performed by a thermal treatment at temperatures of at least 50° C., preferably around 110° C. and/or an alternative method such as microwave radiation.

According to embodiments, the step of curing and drying for making the composite material according to the invention is performed in a compression mold suitable for encapsulating 3D shaped objects.

Furthermore, the invention discloses the use of the composite material according to the invention for thermal insulation and/or acoustic insulation.

Furthermore, the invention discloses the use of the composite material according to the invention as an acoustic and/or thermal insulation panel or a thermal and/or encapsulating insulation shield suitable for encapsulating complicated 3D shaped objects.

The independent and dependent claims set out particular and preferred features of the invention. Features from the dependent claims may be combined with features of the independent or other dependent claims as appropriate.

The above and other characteristics, features and advantages of the present invention will become apparent from the detailed description, taken in conjunction with the accompanying examples which illustrate the principles of the invention.

DEFINITIONS AND TERMS

In the context of the present invention the following terms have the following meaning:
1. "Organic natural material" and/or "organic natural fibers" are limited in this invention towards organic natural material having isocyanate reactive groups, more particular organic natural material having at least hydroxyl and/or amine groups. Examples of suitable organic natural material are wood fibres, wood wool, bamboo fibres, bamboo flakes, . . . .
2. "Composite" refers to materials made from two or more constituent materials with significantly different physical or chemical properties, that when combined, produce a material with characteristics different from the individual components. The individual components remain separate and distinct within the finished structure (composite panel). The final composite material refers to the dried and cured composite material having unreacted remaining water being removed.
3. "Nanoporous particles" are limited in this invention towards particles having porosities in the range 50 to 99%, having densities lower than 300 kg/m$^3$, preferably in the range from 30 to 300 kg/m$^3$ and having particle diameters from 0.001 to 10 mm, preferably from 0.01 to 4 mm. They are preferably silica-based and are referred to in literature as either aerogel, xerogel and/or cryogel particles.
4. The expression "isocyanate-reactive compounds", "isocyanate-reactive hydrogen atoms" and "isocyanate-reactive groups" as used herein refers to active hydrogen atoms in hydroxyl and amine groups present in the isocyanate reactive compounds. Compounds having one hydroxyl group are considered to comprise one reactive hydrogen, compounds having one primary amine group are considered to comprise one reactive hydrogen and one water molecule is considered to comprise two active hydrogens.

5. The word "average" refers to number average unless indicated otherwise.

6. The expression "emulsifiable polyisocyanate" or "emulsifiable MDI" or "e-MDI" as used herein refers to organic polyisocyanates (preferably MDI) which are reacted with water-soluble polyols which contain at least one isocyanate reactive group. An example of a suitable polyol is methoxy poly-ethylene glycol (MPEG).

7. "Lambda value" as used herein refers to the thermal conductivity of a material (also known as k value) normally expressed in mW/m·K. The lower the lambda value the more insulating the material (i.e. better thermal insulation performance).

8. "Acoustic insulation" as used herein refers to reducing sound pressure with respect to a specified sound source and receptor.

DETAILED DESCRIPTION

The present invention will be described with respect to particular embodiments. It is to be noticed that the term "comprising", used in the claims, should not be interpreted as being restricted to the means listed thereafter; it does not exclude other elements or steps. It is thus to be interpreted as specifying the presence of the stated features, steps or components as referred to, but does not preclude the presence or addition of one or more other features, steps or components, or groups thereof. Thus, the scope of the expression "a compound comprising components A and B" should not be limited to compounds consisting only of components A and B. It means that with respect to the present invention, the only relevant components of the compound are A and B.

Throughout this specification, reference to "one embodiment" or "an embodiment" are made. Such references indicate that a particular feature, described in relation to the embodiment is included in at least one embodiment of the present invention. Thus, appearances of the phrases "in one embodiment" or "in an embodiment" in various places throughout this specification are not necessarily all referring to the same embodiment, though they could. Furthermore, the particular features or characteristics may be combined in any suitable manner in one or more embodiments, as would be apparent to one of ordinary skill in the art.

It is to be understood that although preferred embodiments and/or materials have been discussed for providing embodiments according to the present invention, various modifications or changes may be made without departing from the scope and spirit of this invention.

According to a first aspect of the present invention, a reinforced organic natural fiber composite material having a lambda value lower than 35 mW/m·K, preferably in the range 15-30 mW/m·K is disclosed, said composite comprising:
  25-85% by weight hydrophobic nanoporous particles calculated on the total weight of the composite material, and
  At least 10% by weight organic natural fibers having isocyanate reactive groups calculated on the total weight of the composite material, and
  1-15% by weight binder, Wherein the binder used is a polyurea/polyurethane comprising binder made from emulsifiable polyisocyanate, water and surfactants.

According to embodiments, the composite material according to the present invention comprises 25-85% by weight, preferably 35-85% by weight, and more preferably 40-85% by weight hydrophobic nanoporous particles calculated on the total weight of the dried and cured composite material.

According to embodiments, the composite material according to the present invention comprises 10-70% by weight, preferably 10-60% by weight and more preferably 10-50% by weight organic natural fibers having isocyanate reactive groups calculated on the total weight of the dried and cured composite material.

According to embodiments, the composite material according to the present invention comprises 1-15% by weight, preferably 2-10% by weight and more preferably 3-8% by weight binder calculated on the total weight of the dried and cured composite material.

According to embodiments, the nanoporous particles are preferably those based on oxides, more preferably silicon dioxide and metal oxides (wherein the metal is preferably selected from alumina, titanium and/or zirconium). Preference is given to using nanoporous particles comprising silicon compounds. Particular preference is given to nanoporous particles comprising $SiO_2$ and more particularly $SiO_2$ aerogels or xerogels, which are optionally organo-modified.

Preferred nanoporous particles have the following parameters:
  Porosity: 50 to 99%, especially 70 to 99%, more preferably 80 to 99%
  Density: lower than 300 kg/m$^3$, preferably in the range 30 to 300 kg/m$^3$, more preferably <180 kg/m$^3$
  Particle diameter: from 0.001 to 10 mm, preferably from 0.01 to 4 mm
  Pore diameter: 0.1 to 500 nm, especially <200 nm, more preferably <100 nm, especially 1 to 100, preferably 10 to 50 nm.

According to embodiments, the improvement in thermal insulation performance (reduced lambda value) is directly related to the amount of nanoporous particles in the composite material. Higher levels will lead to composite materials with lower lambda values, but too high levels would be detrimental to mechanical properties, with composite materials (e.g. panels) becoming less self supporting.

According to embodiments, the amount of nanoporous particles in the composite material is optimized to obtain the best balance between thermal insulation performance and mechanical properties such as resistance to compression and flexure. To achieve low lambda materials (lambda <35 mW/m·K), the amount of nanoporous particles in the final (dried and cured) composite material should be above about 25% by weight calculated on the total weight of the final dried and cured composite material.

Particularly preferred nanoporous particles are silica based nanoporous particles which are essentially made of amorphous silicon dioxide but, depending on their method of making, may further comprise organic compounds. Most preferred nanoporous particles have lambda values under atmospheric pressure in the range 9-12 mW/m·K at 25° C. together with a low density around 140 kg/m$^3$.

Suitable silica nanoporous particles may be obtained according to known methods from a waterglass solution via the stages of silica hydrogel, solvent exchange and subsequent supercritical drying. The bead form generally present may be the result of a fast-gelling silica sol being sprayed from a specially designed die and the drops gelling in flight.

According to embodiments, the nanoporous particles are hydrophobic, to avoid/limit infiltration of the binder (so they retain their low lambda value).

The nanoporous particles according to the invention are hydrophobic and preferably contain hydrophobic groups on their pore surface. Suitable groups for durable hydrophobicization are for example trisubstituted silyl groups of general formula —Si(R)$_3$, preferably trialkyl- and/or triarylsilyl groups, where each R is independently a nonreactive organic moiety such as C1-C18 alkyl or C6-C14 aryl, preferably C1-C6 alkyl or phenyl, more particularly methyl, ethyl, cyclohexyl or phenyl, which moiety may be additionally substituted with functional groups. The use of trimethylsilyl groups is particularly advantageous for durably hydrophobicizing the nanoporous particles. Introducing these groups may be accomplished by gas phase reaction between the nanoporous particles and, for example, an activated trialkylsilane derivative, e.g., a chlorotrialkylsilane or a hexaalkyldisilazane.

According to embodiments, the nanoporous particles are large enough to be mechanically held in between the organic natural fibers, to avoid having them easily coming out of the boards during installation/handling/use. Suitable nanoporous particles, for example, have diameters in the range 100 μm-1.2 mm (commercially available as Cabot Enova® IC3120).

According to embodiments, the organic natural fibers are selected from organic natural material being cut in small pieces or being present as fibers or wires and having isocyanate reactive groups (hydroxyl groups and/or amine groups) and optionally moisture in the material which reacts with the NCO groups of the isocyanate binder. As a result, the fibers are chemically bonded to the binder (strong covalent urethane/urea bonds).

According to embodiments, organic natural material is selected from wood or bamboo fibers, for example pine fibers (typically used for composite wood panels), but in principle the invention is applicable to any type of wood fibers/chips/particles, even to all types of natural fibers.

According to embodiments, the binder comprises emulsifiable polyisocyanate, preferably the polyisocyanates are selected from organic isocyanates containing a plurality of isocyanate groups including aliphatic isocyanates such as hexamethylene diisocyanate and more preferably aromatic isocyanates such as m- and p-phenylene diisocyanate, tolylene-2,4- and 2,6-diisocyanates, diphenylmethane-4,4'-diisocyanate, chlorophenylene-2,4-diisocyanate, naphthylene-1,5-diisocyanate, diphenylene-4,4'-diisocyanate, 4,4'-diisocyanate-3,3'-dimethyldiphenyl, 3-methyldiphenylmethane-4,4'-diisocyanate and diphenyl ether diisocyanate, cycloaliphatic diisocyanates such as cyclohexane-2,4- and 2,3-diisocyanates, 1-methyl cyclohexyl-2,4- and 2,6-diisocyanates and mixtures thereof and bis-(isocyanatocyclohexyl-)methane and triisocyanates such as 2,4,6-triisocyanatotoluene and 2,4,4'-triisocyanatodiphenyl ether.

According to embodiments, the binder comprises emulsifiable polyisocyanate wherein the polyisocyanate comprises mixtures of isocyanates. For example a mixture of tolylene diisocyanate isomers such as the commercially available mixtures of 2,4- and 2,6-isomers and also the mixture of di- and higher poly-isocyanates produced by phosgenation of aniline/formaldehyde condensates. Such mixtures are well-known in the art and include the crude phosgenation products containing mixtures of methylene bridged polyphenyl polyisocyanates, including diisocyanate, triisocyanate and higher polyisocyanates together with any phosgenation by-products.

Preferred compositions of the present invention are those wherein the polyisocyanate is an aromatic diisocyanate or polyisocyanate of higher functionality in particular crude mixtures of methylene bridged polyphenyl polyisocyanates containing diisocyanates, triisocyanate and higher functionality polyisocyanates. Methylene bridged polyphenyl polyisocyanates (e.g. Methylene diphenyl diisocyanate, abbreviated as MDI) are well known in the art and have the generic formula I wherein n is one or more and in the case of the crude mixtures represents an average of more than one. They are prepared by phosgenation of corresponding mixtures of polyamines obtained by condensation of aniline and formaldehyde.

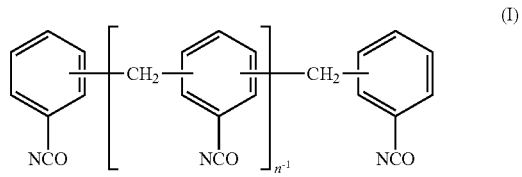

Other isocyanates which can be present in the emulsifiable isocyanate component of the binder of the present invention include isocyanate ended prepolymers made by reaction of an excess of a diisocyanate or higher functionality polyisocyanate with a hydroxyl ended polyester or hydroxyl ended polyether and products obtained by reacting an excess of diisocyanate or higher functionality polyisocyanate with a monomeric polyol or mixture of monomeric polyols such as ethylene glycol, trimethylol propane or butane-diol.

One preferred class of isocyanate-ended prepolymers which may form the isocyanate component of the binder are the isocyanate ended prepolymers of the crude mixtures of methylene bridged polyphenyl polyisocyanates containing diisocyanates, triisocyanates and higher functionality polyisocyanates.

According to embodiments, the emulsifiable polyisocyanate is a reaction product of polyisocyanates and water-soluble polyols, preferably said polyols are selected from monoalkyl ethers and/or polyethylene glycols. The amount of water-soluble polyols is preferably in the range up to 20% by weight, more preferably up to 10% by weight and most preferably up to 5% by weight calculated on the total weight of the polyisocyanate and polyol.

According to embodiments, the emulsifiable polyisocyanate may be a reaction product of >95 wt % polyisocyanates and <5 wt % of monoalkyl ethers and/or polyethylene glycols. For example a suitable e-MDI is made from 97 wt % polymeric MDI and 3 wt % Methoxypolyethylene Glycol (MPEG e.g. MPEG 750).

According to embodiments, the amount of water used to prepare the binder (emulsion of e-MDI in water) can be varied. Typically, the weight ratio of water:emulsifiable polyisocyanate is at least 0.5:1. Preferably there is an excess of water, the excess amount (weight) of water in the binder may be 500 times the weight of emulsifiable polyisocyanate (ratio water:emulsifiable polyisocyanate of 500:1). The presence of water in the binder is crucial because it will react during the final curing of the composite with remaining unreacted isocyanate groups to form polyurea and because it also avoids that the binder infiltrates the nanoporous particles.

According to embodiments, the amount of binder in the obtained composite material is around 6 weight % calculated on the total weight of the final (dried and cured) composite material to achieve acceptable structural integrity of the composite material. The amount of binder in any case has a low impact on lambda value, since it is a minor component in the composite material. Amounts of binder up to 15 weight % are suitable for achieving a low lambda (lambda <35 mW/m·K).

U.S. Pat. No. 6,407,196 discloses emulsifiable MDI and methods to modify polymeric MDI which are suitable to fabricate the emulsifiable polyisocyanate (e-MDI) required to make the binder according to the invention. U.S. Pat. No. 6,407,196 is therefore incorporated herein by reference.

Binders comprising emulsifiable polyisocyanate (e-MDI) are widely used as binders in composite panels. However, the binder comprising emulsifiable polyisocyanate according to the present invention additionally has incorporation of additional amounts of a surfactant (e.g. silicon surfactants) in the formulations.

According to embodiments, the amount of surfactant added to the binder is up to maximum 5 weight % calculated on the total weight of surfactant and water. Preferably the amount of surfactant in the binder is less than 1 weight % calculated on the total weight of surfactant and water. The additional surfactant is crucial to easily disperse the nanoporous particles in between wet organic natural fibers (e.g. wood fibers). In the absence of additional surfactant, the hydrophobic nanoporous particles do not get wetted by the aqueous e-MDI emulsion, therefore making their incorporation in between organic natural fibers almost impossible, or at least extremely difficult. Suitable examples of surfactants are silicon surfactants such as commercially available Tegostab® B8715LF2.

The composite material according to the invention results in stiffer and denser materials compared to state of the art composite materials (e.g. panels) comprising organic natural fibers such as state of the art composite wood panels (for the same volume fraction of organic natural fibers), since air cavities are partially replaced by solid material (the nanoporous particles). It is a surprising effect that by replacing air by a material having higher densities (the nanoporous particles) and hence resulting in composite materials having higher densities, a composite material is achieved having improved thermal insulation performance (i.e. lower lambda values).

The composite material according to the invention results in improved mechanical properties such as resistance to compression and flexure compared to state of the art composite materials comprising organic natural fibers such as state of the art composite wood panels (for the same volume fraction of organic natural fibers), since air cavities are partially replaced by solid material (the nanoporous particles). Depending on the amount of nanoporous particles used, the strength improvement will vary and up to 450% and more improvement may be achieved, this is surprising.

The composite materials according to the invention result in significant improvements in fire properties (reaction/resistance to fire) compared to state of the art composite materials comprising organic natural fibers such as state of the art composite wood panels (for the same volume fraction of organic natural fibers), since air cavities are partially replaced by solid material (the nanoporous particles). The composite material according to the invention shows self-extinguishing properties when exposed to fire (according to the B-2 test of DIN4102-part 1), this in contrast to state of the art composite wood materials which burn after exposure to fire, this is surprising.

The composite materials according to the invention have almost no ageing meaning that the lambda values will remain constant with time.

The composite materials according to the invention have lower humidity uptake compared to state of the art composite materials comprising organic natural fibers such as state of the art composite wood panels (for the same volume fraction of organic natural fibers), since air cavities are partially replaced by solid material (the nanoporous particles) because of the hydrophobic character of the nanoporous particles.

According to a second aspect of the present invention, a process for making the reinforced organic natural fiber composite material according to the first aspect of the invention is disclosed.

The process for making the reinforced organic natural fiber composite material may comprise following steps:
a) Providing a binder comprising water, emulsifiable polyisocyanate and surfactants, and
b) Providing organic natural fibers, and then
c) Mixing the binder and organic natural fibers to obtain a mixture comprising the organic natural fibers and the binder, and then
d) Adding hydrophobic nanoporous particles and mixing to obtain a homogenous mixture comprising the nanoporous particles, the organic natural fibers and the binder, and then
e) Curing and drying the mixture in a compression mold to obtain the reinforced organic natural fiber composite material.

According to embodiments, the step of curing and drying the mixture is a thermal treatment, preferably performed at temperatures of at least 50° C., preferably around 110° C.

According to embodiments, the step of curing and drying the mixture is performed using alternative heating methods such as microwave radiation or a combination of these alternative methods and thermal treatments (performed at temperatures of at least 50° C., preferably around 110° C.).

According to embodiments, the nanoporous particles need to be homogeneously distributed in between the organic natural (wood) fibers, to avoid large phase separation between organic natural material-rich and nanoporous particle-rich areas, for optimum properties (thermal insulation, mechanical properties, reaction/resistance to fire, acoustic insulation, . . . ).

According to embodiments, to retain the high thermal insulation performance of the nanoporous particles, the particles should not be significantly crushed, so gentle mixing may be preferred when mixing the nanoporous particles with the organic natural material-binder mixture.

According to embodiments, the organic natural fibers (e.g. wood fibers) are mixed in a first step with the binder to ensure good impregnation/coating of the wood fibers by the binder. Only then the nanoporous particles can be added and mixed with the organic natural fiber/binder mixture, gently to obtain good wetting and to avoid crushing of the nanoporous particles, and then the resulting mixture comprising the organic natural fibers, the binder and nanoporous particles may be compressed, dried and cured in a mold/press to obtain the reinforced organic natural fiber composite of the present invention.

According to embodiments, the composite material comprises 25-85% by weight, preferably 35-85% by weight, and more preferably 40-85% by weight hydrophobic nanoporous particles calculated on the total weight of the dried and cured composite material.

According to embodiments, the composite material comprises 10-70% by weight, preferably 10-60% by weight and more preferably 10-50% by weight organic natural fibers having isocyanate reactive groups calculated on the total weight of the dried and cured composite material.

According to embodiments, the composite material comprises 1-15% by weight, preferably 2-10% by weight and more preferably 3-8% by weight binder calculated on the total weight of the dried and cured composite material.

According to embodiments, the nanoporous particles are preferably based on oxides, more preferably silicon dioxide and metal oxides (wherein the metal is preferably selected from alumina, titanium and/or zirconium). Preference is given to using nanoporous particles comprising silicon compounds. Particular preference is given to nanoporous particles comprising $SiO_2$ and more particularly $SiO_2$ aerogels or xerogels, which are optionally organo-modified.

Preferred nanoporous particles have the following parameters:
Porosity: 50 to 99%, especially 70 to 99%, more preferably 80 to 99%
Density: lower than 300 kg/m$^3$, preferably in the range 30 to 300 kg/m$^3$, more preferably <180 kg/m$^3$
Particle diameter: from 0.001 to 10 mm, preferably from 0.01 to 4 mm
Pore diameter: 0.1 to 500 nm, especially <200 nm, more preferably <100 nm, especially 1 to 100, preferably 10 to 50 nm.

Particularly preferred nanoporous particles are silica based hydrophobic nanoporous particles which are essentially made of amorphous silicon dioxide which may further comprise organic compounds. Most preferably these nanoporous particles have lambda values under atmospheric pressure in the range 9-12 mW/m·K at 25° C. together with a low density around 140 kg/m$^3$.

According to embodiments, the organic natural fibers are selected from organic natural material being cut in small pieces or being present as fibers or wires and having isocyanate reactive groups (hydroxyl groups and/or amine groups) and optionally moisture in the material which react with NCO groups of the binder. The organic natural material may be selected from wood or bamboo fibers, for example pine fibers (typically used for composite wood panels), but in principle the invention is applicable to any type of wood fibers/chips/particles, even to all types of natural fibers.

According to embodiments, the binder comprises emulsifiable polyisocyanate, preferably the polyisocyanates are selected from organic isocyanates containing a plurality of isocyanate groups including aliphatic and/or aromatic isocyanates, preferably aromatic diisocyanate or polyisocyanate of higher functionality in particular crude mixtures of methylene bridged polyphenyl polyisocyanates containing diisocyanates, triisocyanate and higher functionality polyisocyanates. Other isocyanates which can be present in the binder include isocyanate ended prepolymers made by reaction of an excess of a diisocyanate or higher functionality polyisocyanate with a hydroxyl ended polyester or hydroxyl ended polyether and products obtained by reacting an excess of diisocyanate or higher functionality polyisocyanate with a monomeric polyol or mixture of monomeric polyols such as ethylene glycol, trimethylol propane or butane-diol.

According to embodiments, the emulsifiable polyisocyanate is a reaction product of polyisocyanates and water-soluble polyols, preferably said polyols are selected from monoalkyl ethers and/or polyethylene glycols. The amount of water-soluble polyols is preferably in the range up to 20% by weight, more preferably up to 10% by weight and most preferably up to 5% by weight calculated on the total weight of the polyisocyanate and polyol.

According to embodiments, the emulsifiable polyisocyanate may be a reaction product of >95 wt % polyisocyanates and <5 wt % of monoalkyl ethers and/or polyethylene glycols. For example a suitable e-MDI is made from 97 wt % polymeric MDI and 3 wt % Methoxypolyethylene Glycol (MPEG e.g. MPEG 750).

According to embodiments, the amount of water used to prepare the binder (emulsion of e-MDI in water) can be varied. Typically, the weight ratio of water:emulsifiable polyisocyanate is at least 0.5:1. Preferably there is an excess of water, the excess amount (weight) of water in the binder may be 500 times the weight of emulsifiable polyisocyanate (ratio water:emulsifiable polyisocyanate of 500:1).

According to embodiments, the amount of binder in the obtained composite material is around 6 weight % calculated on the total weight of the final (dried and cured) composite material.

The binder additionally has incorporation of additional amounts of a surfactant (e.g. silicon surfactants) in the formulations. The amount of surfactant added to the binder is up to maximum 5 weight % calculated on the total weight of surfactant and water. Preferably the amount of surfactant in the binder is less than 1 weight % calculated on the total weight of surfactant and water.

According to a third aspect of the present invention the use of the reinforced organic natural fiber composite of the instant invention is disclosed.

According to an embodiment, the use of the reinforced organic natural fiber composite of the instant invention for thermal insulation is disclosed. Said composites having a lambda value lower than 35 mW/m·K, preferably in the range 15-30 mW/m·K. The use for thermal insulation may be in the form of thermal insulation panels or in the form of complicated 3D encapsulating shapes wherein specific molds are used suitable for encapsulating complicated 3D shapes.

According to an embodiment, the use of the reinforced organic natural fiber composite of the instant invention for acoustic insulation is disclosed. The use for acoustic insulation may be in the form of acoustic insulation panels or in the form of complicated 3D encapsulating shapes wherein specific molds are used suitable for encapsulating complicated 3D shapes.

According to an embodiment, the use of the reinforced organic natural fiber composite of the instant invention for acoustic and thermal insulation is disclosed. The use for acoustic and thermal insulation may be in the form of acoustic and thermal insulation panels or in the form of complicated 3D encapsulating shapes wherein specific molds are used suitable for encapsulating complicated 3D shapes.

EXAMPLES

Compounds Used

Suprasec® 1042: emulsifiable MDI from Huntsman
Tegostab® B8715LF2: Silicon surfactant from Evonik Industries
Enova® IC3120: Silica aerogel particles from Cabot (particle density ~140 kg/m$^3$, particle size 0.1-1.2 mm)

Pine wood fibers: average thickness ~30 micrometers, average length ~5 millimeters.

Testing Methods

Compression tests were performed according to standard test method ISO844 on the circular samples (6 cm diameter, without removal of top/bottom facers) with an Instron 5566 universal Testing Machine using plates of 15 cm diameter. Full stress/strain curves were recorded and stress at 15% compression is reported in Table 1.

Flexural tests were performed according to standard test method ISO1209 on rectangular samples (12×2×1 cm$^3$, cut from the 19.5×19.5×1 cm$^3$ composite panels after removal of top/bottom facers) with an Instron 5566 universal Testing Machine and a static 3-point flexure fixture. Full stress/strain curves were recorded and maximum stress (i.e. flexural strength) is reported in Table 1.

Thermal conductivity (lambda value in mW/m·K) was measured according to standard test method ISO8301 on the dry 19.5×19.5×1 cm$^3$ composite panels (without removing the paper facers) on a Lasercomp model Fox200. The mean temperature of the measurement was 10° C., and the bottom and top plates were kept at 20° C. and 0° C., respectively.

Fire testing was performed according to the Kleinbrenner or B-2 test (DIN 4102-Part 1) on rectangular samples (19×9×1 cm$^3$, cut from the 19.5×19.5×1 cm$^3$ composite panels after removal of top/bottom facers).

Density (in kg/m$^3$) was measured according to standard test method ISO845 on the dry 19.5×19.5×1 cm$^3$ composite panels (after removal of the paper facers) by dividing the mass of the panel by its volume.

Damping coefficients (acoustic tests) were determined on the circular samples (6 cm diameter, without removal of top/bottom facers). The experimental setup comprised a shaker, a table on top of the shaker, a mass and accelerometers. Samples were positioned on the shaker between the table and the mass. Accelerometers were positioned on both the table and the mass (50 g, including accelerometer). Sinusoidal waves were applied to the table with frequencies ranging between 0.5 and 200 Hz. The data recorded was the ratio of mass acceleration to table acceleration. Damping coefficients were determined by fitting the data with the Kelvin-Voigt model.

Comparative Example 1: Fabrication of a Wood Fiber Composite (Density 179 kg/m$^3$), Free of Aerogel Particles Suprasec® 1042 (0.38 g), Tegostab® B8715LF2 (0.08 g) and water (145 g) were mixed in a 1 L plastic cup with a Heidolph mixer (~500 rpm) for 5 minutes to form an emulsion. Pine wood fibers (7.25 g) were then added to the emulsion and mixed with the same mixer (500 rpm) for 30 minutes. The resulting mixture was then transferred to a pre-heated (110° C.) aluminum circular compression mold (6 cm diameter, 1.5 cm thickness, comprising small venting holes on the top, bottom and sides) which contained in the bottom a paper facer. Another paper facer was positioned on top of the mixture, and the mold was then closed with a C-clamp. The wood/binder composite was then cured and dried in an extracted oven at 110° C. for 6 hours. After letting the mold cooling down to room temperature (~1 additional hour), a dry self-supporting circular rigid composite sample (6 cm diameter) was easily removed from the mold. This circular sample was used for compression and acoustic tests.

For lambda value determination, flexural and Kleinbrenner tests, a 19.5×19.5×1 cm$^3$ composite panel of the same composition was synthesized following the same procedure with a 5 L plastic bucket, a 19.5×19.5×1 cm$^3$ compression mold, and the following amounts: Suprasec® 1042, 3.42 g; Tegostab® B8715LF2, 0.68 g; water, 1300 g; pine wood fibers, 65 g.

The cured and dried composite composition and properties are summarized in Table 1.

Example 1: Fabrication of a Reinforced Wood Fiber Composite (Density 165 kg/m$^3$) According to the Invention, with ~37.5 w % of Aerogel Particles Suprasec® 1042 (0.38 g), Tegostab® B8715LF2 (0.08 g) and water (145 g) were mixed in a 1 L plastic cup with a Heidolph mixer (~500 rpm) for 5 minutes to form an emulsion. Pine wood fibers (4.35 g) were then added to the emulsion and mixed with the same mixer (500 rpm) for 30 minutes. Enova® IC3120 particles were then added (2.90 g) and gently hand mixed with a spatula for a few minutes until a homogeneous wood fibers/aerogel particles distribution is obtained. The resulting mixture was then transferred to a pre-heated (110° C.) aluminum circular compression mold (6 cm diameter, 1.5 cm thickness, comprising small venting holes on the top, bottom and sides) which contained in the bottom a paper facer. Another paper facer was positioned on top of the mixture, and the mold was then closed with a C-clamp. The wood/binder/aerogel composite was then cured and dried in an extracted oven at 110° C. for 6 hours. After letting the mold cooling down to room temperature (~1 additional hour), a dry self-supporting circular rigid composite sample (6 cm diameter) was easily removed from the mold. Visual inspection revealed a homogeneous wood/aerogel distribution within the sample. This circular sample was used for compression and acoustic tests.

For lambda value determination, flexural and Kleinbrenner tests, a 19.5×19.5×1 cm$^3$ composite panel of the same composition was synthesized following the same procedure with a 5 L plastic bucket, a 19.5×19.5×1 cm$^3$ compression mold, and the following amounts: Suprasec® 1042, 3.42 g; Tegostab® B8715LF2, 0.68 g; water, 1300 g; pine wood fibers, 39 g; Enova® IC3120, 26 g.

The cured and dried composite composition and properties are summarized in Table 1.

Example 2: Fabrication of a Reinforced Wood Fiber Composite (Density 163 kg/m$^3$) According to the Invention, with ~56.5 w % of Aerogel Particles The same experimental procedure as for example 1 was repeated, using the following amounts:

Circular sample: Suprasec® 1042, 0.38 g; Tegostab® B8715LF2, 0.08 g; water, 145 g; pine wood fibers, 2.90 g; Enova® IC3120, 4.35 g.

Panel: Suprasec® 1042, 3.42 g; Tegostab® B8715LF2, 0.68 g; water, 1300 g; pine wood fibers, 26 g; Enova® IC3120, 39 g.

Self-supporting rigid composite samples were obtained.

Example 3: Fabrication of a Reinforced Wood Fiber Composite (Density 153 kg/m$^3$) According to the Invention, with ~75 w % of Aerogel Particles The same experimental procedure as for example 1 was repeated, using the following amounts:

Circular sample: Suprasec® 1042, 0.38 g; Tegostab® B8715LF2, 0.08 g; water, 145 g; pine wood fibers, 1.45 g; Enova® IC3120, 5.8 g.
Panel: Suprasec® 1042, 3.42 g; Tegostab® B8715LF2, 0.68 g; water, 1300 g; pine wood fibers, 13 g; Enova® IC3120, 52 g.
Self-supporting rigid composite samples were obtained.

Comparative Example 2: Fabrication of a Wood Fiber Composite (Density 110 kg/m$^3$), Free of Aerogel Particles The same experimental procedure as for Comparative example 1 was repeated, using the following amounts:
Circular sample: Suprasec® 1042, 0.25 g; Tegostab® B8715LF2, 0.05 g; water, 97 g; pine wood fibers, 4.83 g.
Panel: Suprasec® 1042, 2.28 g; Tegostab® B8715LF2, 0.46 g; water, 867 g; pine wood fibers, 43.35 g.

Panel: Suprasec® 1042, 4.18 g; Tegostab® B8715LF2, 0.84 g; water, 1590 g; pine wood fibers, 43.50 g; Enova® IC3120, 35.97 g.
Self-supporting rigid composite samples were obtained.

Comparative Example 3: Fabrication of a Reinforced Wood Fiber Composite with ~76 w % of Aerogel Particles and Free of Surfactant The same experimental procedure as for example 3 was repeated, using the following amounts:
Circular sample: Suprasec® 1042, 0.38 g; water, 145 g; pine wood fibers, 1.45 g; Enova® IC3120, 5.8 g.
Panel: Suprasec® 1042, 3.42 g; water, 1300 g; pine wood fibers, 13 g; Enova® IC3120, 52 g.
Incorporation of the Enova® particles in between wood fiber was not homogeneous, resulting in a useless non self-supporting composite.

TABLE 1

Composite compositions and properties

| | w % wood | w % aerogel | w % binder | Density (kg/m$^3$) | Thermal conductivity (mW/m·K at 10° C.) | Compressive stress at 15% compression (kPa) | Flexural strength (kPa) | B2 test (flame height after 15 s, cm) | Damping coefficient (Acoustic test) |
|---|---|---|---|---|---|---|---|---|---|
| Comparative example 1 | ~94 | 0 | ~6 | 179 | 47.7 | 139 | 184 | 8$^a$ | n.m. |
| Example 1 | ~56.5 | ~37.5 | ~6 | 165 | 30.0 | 134 | 169 | 4$^b$ | n.m. |
| Example 2 | ~37.5 | ~56.5 | ~6 | 163 | 22.9 | 124 | 75 | 4$^b$ | n.m. |
| Example 3 | ~19 | ~75 | ~6 | 153 | 18.1 | 115 | c | 2$^b$ | n.m. |
| Comparative example 2 | ~94 | 0 | ~6 | 110 | 41.8 | 40 | c | 8$^a$ | 0.140 |
| Example 4 | ~66 | ~28 | ~6 | 154 | 33.6 | 120 | c | 3$^b$ | n.m. |
| Example 5 | ~51.5 | ~42.5 | ~6 | 194 | 25.5 | 217 | 143 | 4$^b$ | 0.180 |
| Comparative example 3 | ~19 | ~76 | ~5 | n.m. | n.m. | n.m. | n.m. | n.m. | n.m. | n.m.: not measured
$^a$sample continues to burn after removal of flame (flame height after 20 s > 15 cm)
$^b$sample self extinguishes after removal of flame
c: too low to be measured Self-supporting rigid composite samples were obtained.

Example 4: Fabrication of a Reinforced Wood Fiber Composite (Density 154 kg/m$^3$) According to the Invention, with ~28 w % of Aerogel Particles The same experimental procedure as for example 1 was repeated, using the following amounts:
Circular sample: Suprasec® 1042, 0.36 g; Tegostab® B8715LF2, 0.07 g; water, 137 g; pine wood fibers, 4.83 g; Enova® IC3120, 2.02 g.
Panel: Suprasec® 1042, 3.23 g; Tegostab® B8715LF2, 0.65 g; water, 1228 g; pine wood fibers, 43.3 g; Enova® IC3120, 18.1 g.
Self-supporting rigid composite samples were obtained.

Example 5: Fabrication of a Reinforced Wood Fiber Composite (Density 194 kg/m$^3$) According to the Invention, with ~42.5 w % of Aerogel Particles The same experimental procedure as for example 1 was repeated, using the following amounts:
Circular sample: Suprasec® 1042, 0.47 g; Tegostab® B8715LF2, 0.09 g; water, 177 g; pine wood fibers, 4.85 g; Enova® IC3120, 4.01 g.

CONCLUSIONS

Incorporation of aerogel particles in the composites leads to significantly lower lambda values (well below 35 mW/m·K, as low as 18.1 mW/m·K for example 3) compared to aerogel-free composites (comparative examples 1 and 2, lambda >40 mW/m·K).
Incorporation of aerogel particles in the composites leads to significantly better fire test results (see B2 tests) compared to aerogel-free composites (comparative examples 1 and 2).
Comparative examples 1 and 2 confirm that for aerogel-free composites, lambda value decreases to some extent with a decrease in density but mechanical properties are negatively impacted (see stress at 15% compression and flexural strength data). Contrarily, looking at comparative example 2, example 4 and example 5, incorporation of aerogel particles not only leads to a decrease in lambda value but also in significantly increased density and improved mechanical properties.
Example 3 and comparative example 3 show that the presence of a surfactant is needed for a homogeneous incorporation of the aerogel particles in between the wood fibers and to obtain self-supporting composites.
Acoustic tests: looking at comparative example 2 and example 5, incorporation of aerogel particles leads to improved damping. An improvement in damping of 28% was achieved by incorporation of the aerogel particles.

The invention claimed is:

1. A reinforced organic natural fiber composite material having a lambda value in the range 15-35 mW/mK, said composite material comprising:
   25-85% by weight of hydrophobic nanoporous particles calculated on the total weight of the composite material, and
   at least 10% by weight of organic natural fibers having isocyanate reactive groups calculated on the total weight of the composite material, and
   1-15% by weight of binder calculated on the total weight of the composite material,
   wherein, the binder is a polyurea/polyurethane binder made from emulsifiable polyisocyanate, water, and surfactants.

2. The reinforced organic natural fiber composite material according to claim 1 wherein the composite material comprises 10-70% by weight of organic natural fibers having isocyanate reactive groups calculated on the total weight of the composite material.

3. The reinforced organic natural fiber composite material according to claim 1 wherein the hydrophobic nanoporous particles are aerogel particles based on oxides and/or metal oxides wherein the metal of the metal oxides is selected from the group consisting of alumina, titanium, and/or zirconium oxides.

4. The reinforced organic natural fiber composite material according to claim 1 wherein the hydrophobic nanoporous particles have the following parameters:
   Porosity: 50 to 99%,
   Density: lower than 300 kg/m$^3$,
   Particle diameter: from 0.001 to 10 mm,
   Pore diameter: 0.1 to 500 nm.

5. The reinforced organic natural fiber composite material according to claim 1 wherein the hydrophobic nanoporous particles are aerogel particles which are organo-modified with hydrophobic groups, are based on silicon dioxide ($SiO_2$) and have lambda values under atmospheric pressure in the range 9-12 mW/mK at 25° C. together with a low density around 140 kg/m$^3$.

6. The reinforced organic natural fiber composite material according to claim 1 wherein the hydrophobic nanoporous particles have hydrophobic groups on their pore surface selected from trisubstituted silyl groups of general formula —Si(R)$_3$ where each R is independently a nonreactive organic moiety selected from the group consisting of such as C1-C18 alkyl, C6-C14 aryl, methyl, ethyl, cyclohexyl, or phenyl, and wherein such moiety may be additionally substituted with functional groups.

7. The reinforced organic natural fiber composite material according to claim 1 wherein the organic natural fibers comprise wood or bamboo fibers.

8. The reinforced organic natural fiber composite material according to claim 1 wherein the binder comprises emulsifiable polyisocyanate which is a reaction product of >95 wt % polyisocyanates and <5 wt % of monoalkyl ethers and/or polyethylene glycols calculated on the total weight of the emulsifiable polyisocyanate.

9. The reinforced organic natural fiber composite material according to claim 1 wherein the binder comprises up to maximum 5 weight % surfactants calculated on the total weight of surfactant and water.

10. A process for making the reinforced organic natural fiber composite material according to claim 1, said process comprising the following steps:
    a) providing the binder comprising water, emulsifiable polyisocyanate, and surfactants, and
    b) providing the organic natural fibers, and then
    c) mixing the binder and organic natural fibers to obtain a mixture comprising the organic natural fibers and the binder, and then
    d) adding the hydrophobic nanoporous particles to the mixture obtained in c) and mixing to obtain a homogenous mixture comprising the hydrophobic nanoporous particles, the organic natural fibers and the binder, and then
    e) curing and drying the mixture in a compression mold to obtain the reinforced organic natural fiber composite material.

11. The process according to claim 10 wherein the step of curing and drying is performed by a thermal treatment at temperatures of at least 50° C. and/or via microwave radiation.

12. The process according to claim 11 wherein the step of curing and drying is performed in a compression mold suitable for encapsulating 3D shaped objects.

13. The reinforced organic natural fiber composite material according to claim 3 wherein the alumina, titanium, and/or zirconium oxides are organo-modified.

* * * * *